United States Patent [19]

Takayama et al.

[11] Patent Number: 4,587,568
[45] Date of Patent: May 6, 1986

[54] ELECTRONIC PRINT BOARD

[75] Inventors: Shoichiro Takayama; Yukio Suga; Joji Tadokoro; Yukinori Takeda, all of Tokyo, Japan

[73] Assignee: OKI Electric Industry Co., Ltd., Tokyo, Japan

[21] Appl. No.: 588,548

[22] Filed: Mar. 12, 1984

[30] Foreign Application Priority Data

Mar. 18, 1983 [JP] Japan .................................. 58-44283
Mar. 18, 1983 [JP] Japan .................................. 58-44284

[51] Int. Cl.$^4$ .......................... H04N 1/10; H04N 1/00
[52] U.S. Cl. .................................... 358/293; 358/285; 358/294; 434/430; 434/429; 434/411
[58] Field of Search ............... 358/293, 294, 285, 256; 434/408, 409, 411, 413, 412, 416, 426, 427, 428, 429, 430, 433; 178/18; 250/578, 563, 559; 355/5, 13

[56] References Cited

U.S. PATENT DOCUMENTS 4,449,152 5/1984 Kurata et al. ........................ 358/293
4,486,787 12/1984 Gocho et al. ........................ 358/294

Primary Examiner—Michael A. Masinick
Assistant Examiner—John K. Peng
Attorney, Agent, or Firm—Wyatt, Gerber, Shoup, Scobey & Badie

[57] ABSTRACT

A pattern erasably written on a black board or a flexible sheet in a meeting is printed to a hard copy through scanning of the pattern by an image sensor which provides an electrical signal relating to the pattern, and printing the pattern on a paper according to said electrical signal. The present print board comprises a housing, a writing sheet or a black board mounted on said housing, an elongated lamp for illuminating an elongated portion of said sheet, an image sensor to provide an electrical signal relating to the pattern on a scanning line on the sheet illuminated by said lamp, means for relatively moving said image sensor to said sheet for full scanning of the pattern, and a printer for providing a hard copy of the pattern with smaller size than said pattern according to said electrical signal from said image sensor. The present print board has also a digital memory for storing the output of the image sensor for the late printing, and/or means for transmitting and receiving the pattern signal to and from a telephone line for a remote printing.

14 Claims, 12 Drawing Figures

Fig. 1
Fig. 2
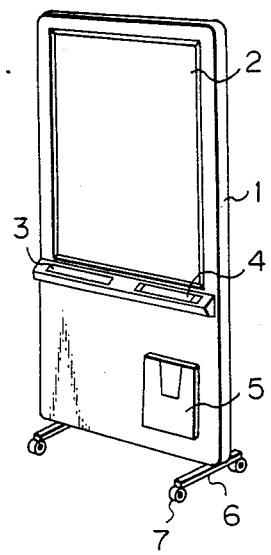
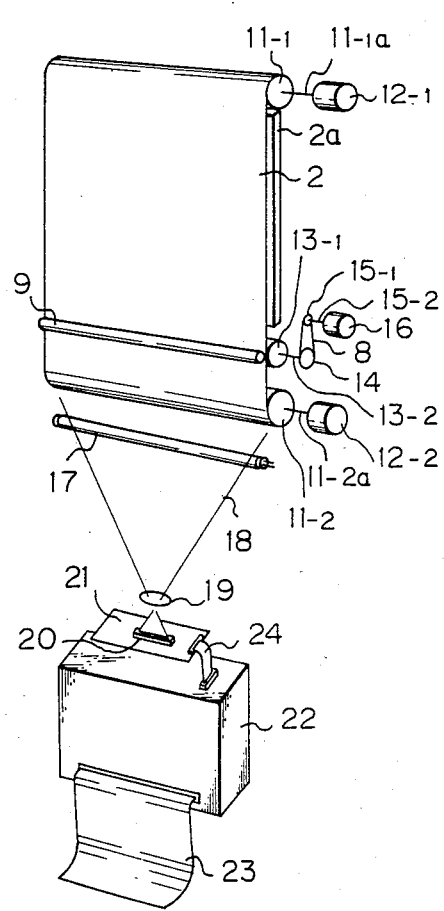

Fig. 5B
(a) MOTOR 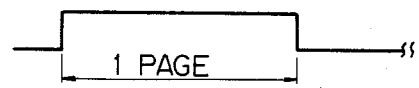
1 PAGE
(b) GATE 
(c) LAMP(17) 
(d) 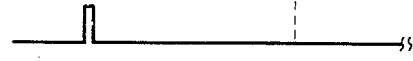

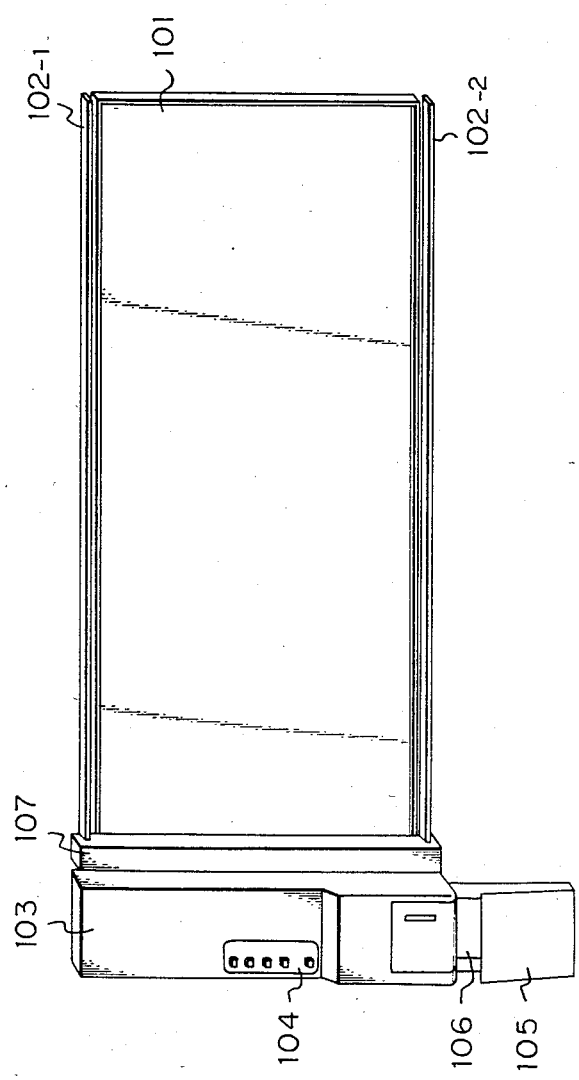

ELECTRONIC PRINT BOARD

BACKGROUND OF THE INVENTION

The present invention relates to a print board which is the combination of a black board, and a copying machine, in which a pattern drawn on a black board is automatically copied to provide a hard copy of that pattern.

Conventionally, a black board has been used in a meeting which has a plurality of participants. And, all the participants of the meeting must take a memorandum on their own notebooks. Alternatively, a memorandum by the particular person is copied by using a conventional copying machine.

Accordingly, there have been drawbacks in a conventional meeting as follows.

(a) As a person must take a memorandum, he can not speak (or even can not listen to), when he is writing a memorandum.

(b) The meeting must be slow, due to taking memorandum.

(c) Some errors occur in taking memorandum.

(d) There is some delay to obtain a copy of the memorandum since the memorandum must be proof read.

SUMMARY OF THE INVENTION

It is an object, therefore, of the present invention to overcome the disadvantages and limitations of a prior meeting system by providing a new an improved meeting system.

It is also an object of the present invention to provide an electronic print board which has a writing means like a black board or a sheet, and means for automatically providing a hard copy of the pattern on said writing means.

The above and other objects are attained by an electronic print board comprising a housing, a writing means mounted on said housing so that any pattern is erasably written with a pen means, an elongated lamp for illuminating an elongated portion of said writing means, an image sensor mounted in said housing to provide an electrical signal relating to the pattern on a scanning line which is illuminated by said lamp, means for relatively moving said image sensor to said writing means for full scanning of the pattern on said writing means, and a printer for printing the pattern on said writing means with smaller size than said pattern according to said electrical signal from said image sensor.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 shows an external view of the present print board,

FIG. 2 shows the fragmentary view of the print board of Fig. 1,

FIG. 5B shows an operational time chart of the circuit of FIG. 5A, FIGS. 6 through 11 show structure of another embodiment of the present print board.

DESCRIPTION OF THE PREFERRED EMBODIMENTS

Figure 3:
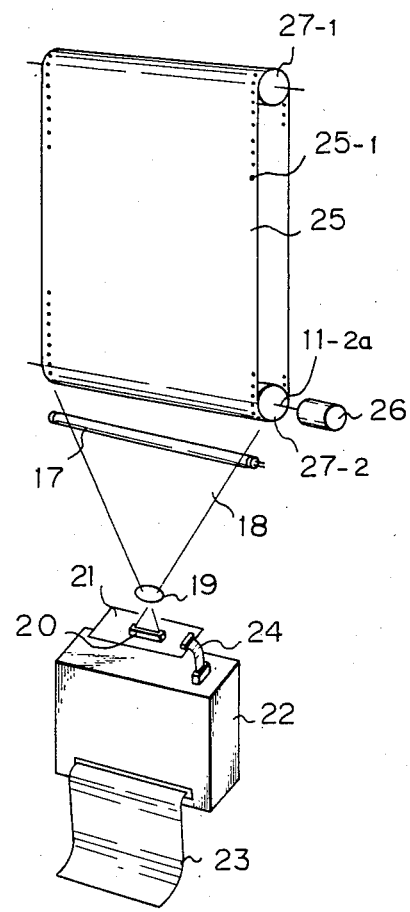
FIG. 3 and FIG. 4 show the structures of the modifications of the print board of FIG. 1.

FIG. 1 shows the perspective view of the print board according to the present invention, and FIG. 2 shows the fragmentary drawing of FIG. 1. In those figures, the numeral 1 is a housing, 2 is a flexible writing sheet, 3 is a dish for accepting a pen means like a felt pen, 4 is an operating panel, 5 is a hopper for accepting a printed paper, 6 is a leg, and 7 is a castor mounted on said leg. In FIG. 2, the numeral 2a is a cardboard mounted behind the writing sheet to provide a fixed rigid plane, 8 is a timing belt, 9 is a roller, 11-1 is a first drum for drawing out a writing sheet, 11-2 is a second drum for winding up the writing sheet, 11-1a is a shaft connecting said first drum 11-1 and the motor 12-1, 11-2a is a shaft connecting the second drum 11-2 and the motor 12-2, 12-1 is a motor for rotating the first drum 11-1, 12-2 is a motor for rotating the secoond drum 11-2, 13-1 is a pinch roller for transferring the writing sheet 2 with the constant predetermined speed, 13-2 is a shaft for connecting the pinch roller 13-1 and the pully 14, 14 is a pully for decreasing the rotational speed, 15-1 is a pully for decreasing the relational speed, 15-2 is a shaft for connecting the motor 16 and the pully 15-1, 16 is a motor for transferring the sheet 2, 17 is an elongated linear light source which is for instance a fluorescent lamp, 18 is a light beam, 19 is a lens, 20 is an image sensor for converting optical pattern on the sheet 2 to an electrical signal, 21 is a circuit board which mounts said image sensor 20, 22 is a printing apparatus which operates for instance on a thermal printing principle, 23 is a printing paper, and 24 is a flat cable for connecting the circuit board 21 and the printing apparatus 22.

The print board of FIGS. 1 and 2 operates as follows.

The drum 11-1 is parallel to the drum 11-2, and a writing sheet 2 is wound around the drums 11-1 and 11-2. The drum 11-1 is coupled with the motor 12-1 through the shaft 11-1a, and the drum 11-2 is coupled with the motor 12-2 through the shaft 11-2a. The writing sheet 2 is sandwiched by the pinch roller 13-1 and the capstan roller 9 which transfers the sheets with the predetermined speed. The pinch roller 13-1 is rotated by the motor 16 through the shaft 15-2, the pully 15-1, the timing belt 8, the pully 14 and the shaft 13-2.

Upon operation of the operation panel 4, the motors 12-1, 12-2 and 16 rotate so that the sheet 2 is transferred by the pinch roller 13-1 and is wound up by the drum 11-2 from the drum 11-1. The running speed of the sheet 2 is determined by the motor 16. Therefore, the pattern written on the sheet 2 with a felt pen moves downwards, and is illuminated by the fluorescent lamp 17 before the pattern is wound up by the drum 11-2.

A pattern on the sheet 2 is converted to an electrical signal on a scanning principle. A scanning line illuminated by the lamp 17 is projected on the image sensor 20 through lens 19. The numeral 18 is a beam of scanned pattern. The main scanning of the pattern is effected by the image sensor 20, and the sub-scanning of the pattern is accomplished by moving the sheet 2 wherein the output signal of the image sensor 20 is synchronized with the moving speed of the sheet 2. The output signal of the image sensor 20 is applied to the printer through the flat cable 24 and the circuit board 21. The printer 22 which is a thermal printer in the embodiment, prints the pattern of the electrical signal on the paper 23. Thus, the visible pattern on the sheet 2 is first converted to an electrical signal on the scanning principle, and the electrical signal prints that pattern on the paper.

The sheet 2 can also move in the reverse direction, that is to say, the sheet 2 can be wound up by the drum 11-1. In that case, the pattern which is wound up by the drum 11-2 appears again on a screen, then, any addition or correction to the pattern is effected. Then, the sheet is wound up by the drum 11-2 and the pattern on the sheet 2 is printed on the paper 23 as described before.

The pattern on the sheet 2 can be erased when the pattern is printed. In that case, the pattern wound up by the drum 11-2 is reversed to the screen, and then, the pattern is erased by and eraser or a wiper.

When a sheet 2 is made of mylar film or fluorine film, a pattern of the sheet is erased simply by friction. Erasing is also possible by illuminating the sheet with ultra-violet beam when a pattern is written with an ink which is erased by ultra-violet beam.

FIG. 3 is a modification of the present print board. In the figure, the numeral 25 is an endless sheet, 25-1 is a sprocket hole provided at the sides of the endless sheet 25, 26 is a motor, 27-1 and 27-2 are drums, other numerals in FIG. 3 are the same as those of FIGS. 1 and 2. In operation, the signal from the operation panel 4 rotates the motor 26 which rotates the drum 27-2 through the shaft 11-2a. The drum 27-2 has a sprocket which engages with holes on the sheet 25, thus, the sheet 25 does not slip. The embodiment of FIG. 3 has the feature that the sheet 25 is an endless loop.

Figure 4:
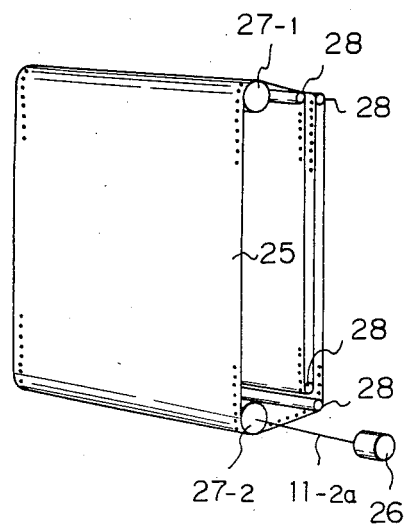

FIG. 4 shows another modification of the present invention, in which the length of an endless sheet is longer than that of FIG. 4. In FIG. 4, a plurality of rollers 28 are provided, and an endless sheet 25 runs through those rollers. Therefore, the total length of the endless sheet 25 is long. In operation, the motor 26 moves the sheet 25 with a constant speed. The sheet 25 runs through the roller 27-2 and between the rollers 28. Other operation of FIG. 4 is the same as that of FIGS. 1 and 2.

Figure 5A:
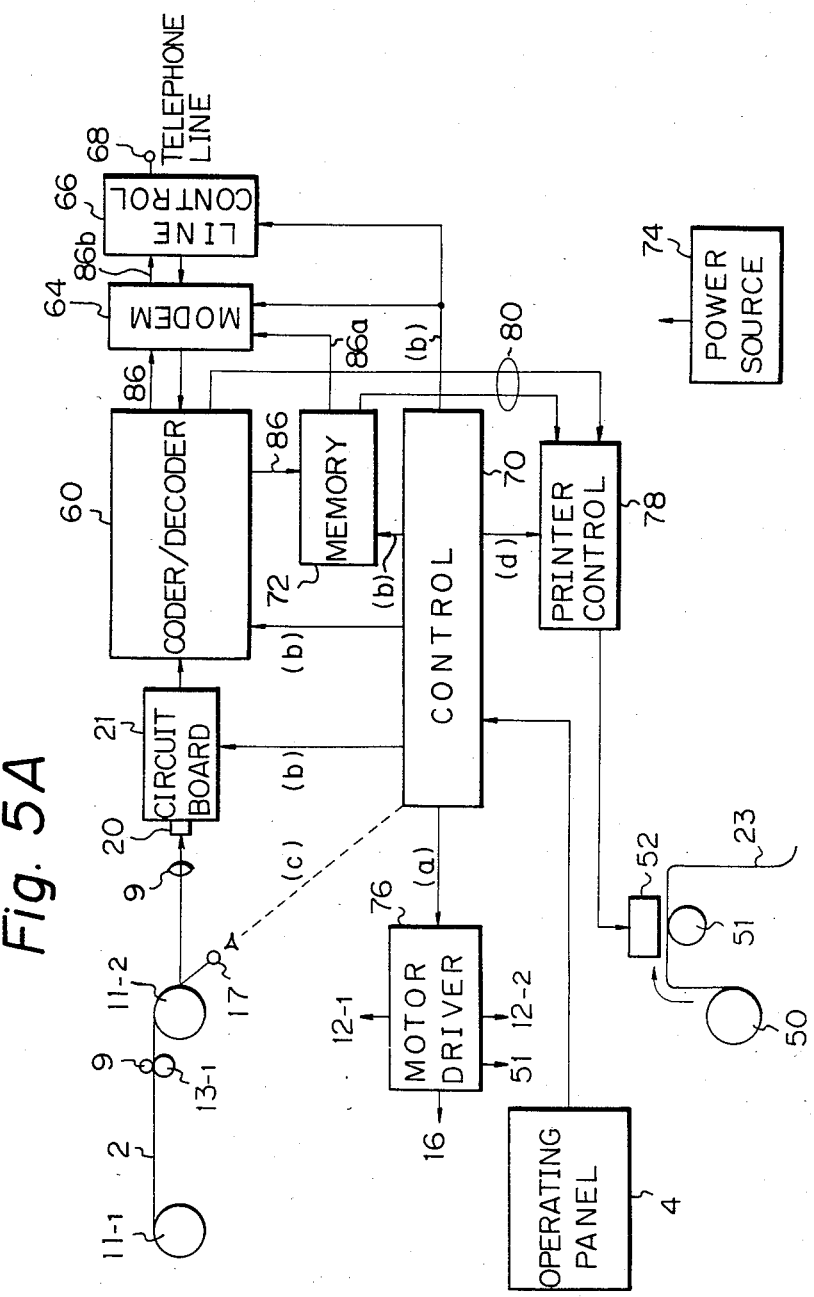
FIG. 5A is a block diagram of an electrical circuit of the print board of FIG. 1.

FIG. 5A is an electrical block diagram of the embodiments in FIGS. 1 through 4, in which a communication facility together with a memory are provided. In the figure, the numeral 50 is a roller which has a printing paper 23, 51 is a roller for pressing the paper 23 to the printing head 52. The printing head 52 is for instance a thermal head for printing on a thermal paper. The numeral 60 is a coder/decoder for coding a picture signal and/or decoding a signal from a telephone line to an analog picture signal, 64 is a modem, 66 is a line control circuit provided between the modem 64 and a telephone line, 68 is a terminal for coupling the apparatus with a telephone line, 70 is a control circuit for providing control signals to each portion of the apparatus, 72 is a digital memory for storing a picture signal, 74 is a power source for providing electrical power to each portion of the apparatus, 76 is a motor driver for supplying power to the motors, 78 is a printer control, 80 is a picture data, 86 and 86a and 86b are digital picture data. Other numerals are the same as those of FIGS. 1 and 2.

In operation, when the operating panel 4 sends a signal to the control 70, the control 70 triggers the motor driver 76 which rotates each motor (12-1, 12-2, 16 and 51), then those motors rotate to move a writing sheet which is supposed have a pattern on the same (see FIG. 5B(a)). The motors rotates so that the sheet is moved by one page. With some delay from the start of the motors, the control 70 gets on the elongated linear fluorescent lamp 17 (see FIG. 5B(c)), then, the lamp 17 illuminates the sheet behind the screen, and the image sensor 20 converts the visual pattern on a scanning line to an electrical signal. That signal is applied to the coder/decoder 60 which converts the picture signal to a digital form. The coder/decoder 60 provides the digital signal 86 to the memory 72 and the modem 64, together with a picture signal 80 to the printer control 78. The digital signal of the output of the coder/decoder 60 is transmitted to a telephone line through the modem 64 and the line control circuit 66. Similarly, when a signal is transmitted from a telephone line, the present apparaus receives that signal and decodes the signal by the coder/decoder 60. The coder/decoder 60 applies the decoded picture signal 80 to the print control circuit 72.

With some delay from the lamp 17 got on (FIG. 5B(c)), the control 70 provides a gate signal (FIG. 5B(b)) to the circuits 21, 60, 64 and 66, and trigger pulse (FIG. 5B (d)) to the print control circuit 78, then, the print control circuit 78 forwards the picture signal to the printing head 52. Then, the printing on the paper 23 is effected. Thus, the pattern written on the sheet 2 is copied on the paper 23 through the scanning by the image sensor 20.

Similarly, a picture signal forwarded from an external telephone line is also printed on the paper 23. Thus, the pattern on a remote print board can be printed on a paper through a telephone line.

The present apparatus of FIG. 5A has also a digital memory 72 which stores a digital picture pattern.

The memory 72 stores the picture pattern information which is provided by the coder/decoder 60 through the line 86. The stored pattern is read out upon operation of the operating panel 4, and the read out signal is applied to the printing control 78 to print on a paper 23. Alternatively, the read out signal may be forwarded to an external telephone line through the modem 64 and the line control 66 so that a remote print board similar to the present apparatus may copy the pattern.

Figure 7:
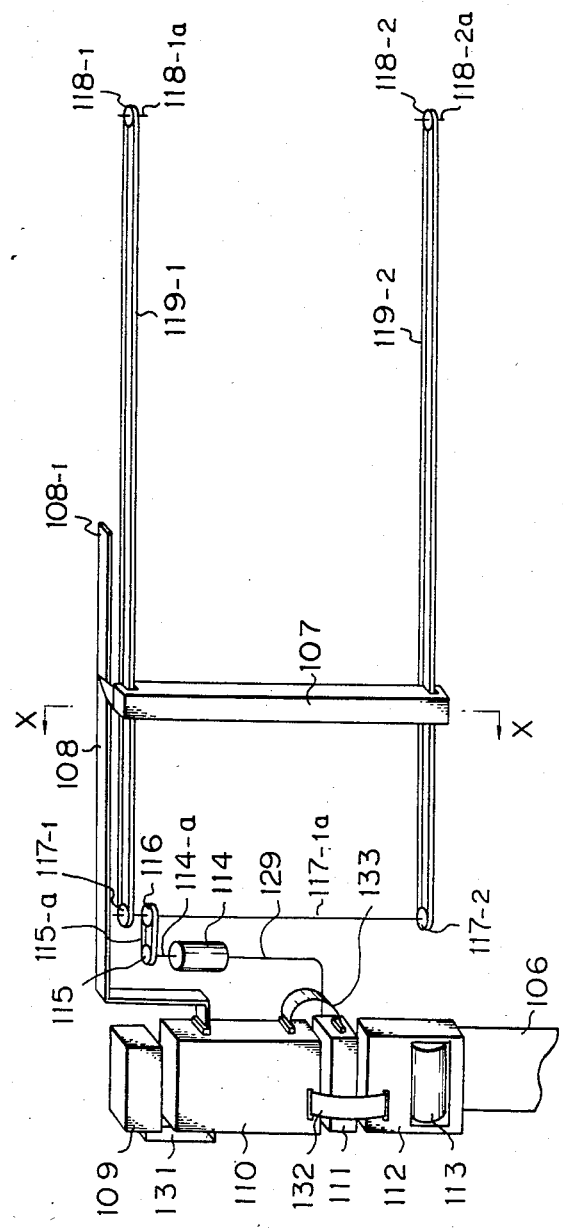
Figure 10:
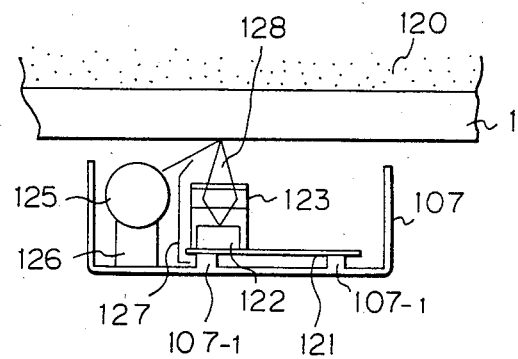
Figure 11:
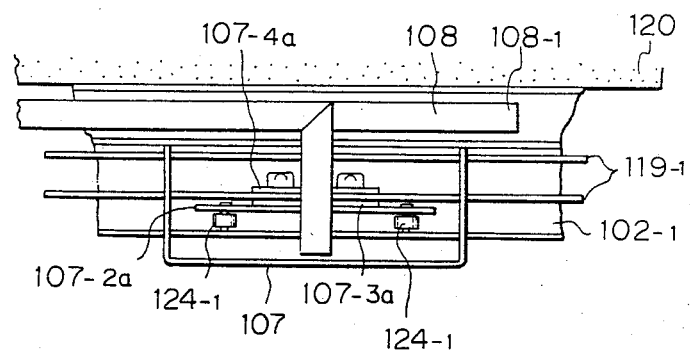

Now, another embodiment of the present invention is described in accordance with FIGS. 6 and 11. In FIG. 6, the numeral 101 is a black board which is subject to be written by a chalk, 102-1 and 102-2 are rails, 103 is a cover of the apparatus, 104 is an operation panel, 105 is a paper stacker, 106 is a printing paper, 107 is a sensor carrier which carries an image sensor and slides along the rails 102-1 and 102-2. FIG. 7 shows the detailed structure of the apparatus of FIG. 6, FIG. 8 is a detailed drawing of a component of FIG. 6, FIG. 9 is the cross section of the sensor carrier at the line X—X of FIG. 7, FIG. 10 is the cross section of the sensor carrier at the line A—A of FIG. 9 and FIG. 11 is the cross section of the sensor carrier at the line B—B of FIG. 9.

In FIG. 7, the numeral 108 is a flat cable, 109 is a power source unit, 110 is a circuit box which has a coder/decoder, a memory, a modem, a line control, and control et al, 111 is a motor driver, 112 is a print circuit unit which has a print control and a printer, 113 is a print paper roller, 114 is a motor, 114-a is a shaft of the motor, 115 and 116 are pullies, 115-a is a belt, 117-1, 117-2, 118-1 and 118-2 are pullies, 118-1a and 118-2a are shafts of the pullies 118-1 and 118-2, respectively. The numeral 119-1 and 119-2 are timing belts, 129 is a motor cable, and 131, 132, and 133 are flat cables.

Figure 8:
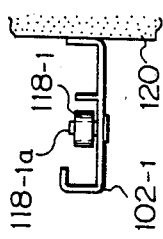

In FIG. 8, 120 is a wall of the present print board to which the rail 102-1 is fixed.

Figure 9:
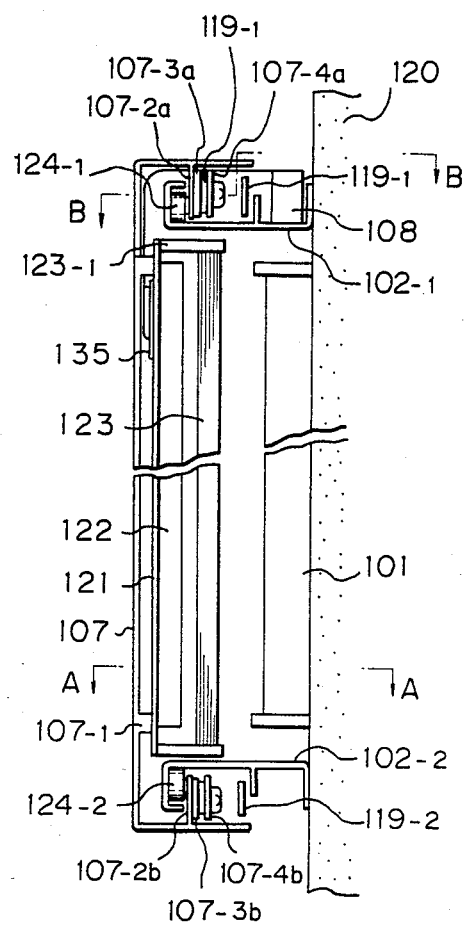

In FIG. 9, the numeral 121 is a printed circuit board, 22 is an image sensor, 123 is a rod lens, 124-1 and 124-2 are rollers for supporting the movable image sensor, 135 is a connector for coupling the carrier sensor electrically to the circuit box 110.

In FIG. 10, the numeral 125 is an elongated lamp, 126 is a socket of the lamp, 127 is an optical shield, and 128 is a light beam.

The print board of the present embodiment has a black board 101 which has a movable image sensor carriage 107, and the electrical unit (103, 104, 105, and 106). The electrical unit is positioned at the right side or the left side of the black board, and is covered with the cover 103. That unit is fixed to the wall 120. The movable sensor carriage 107 moves along the rails 102-1 and 102-2 so that the spacing between the black board surface and the sensor is constant. The rails 102-1 and 102-2 are mounted on the upper side and the bottom side of the black board 101 and are fixed to the wall 120 as shown in FIG. 8.

In FIG. 7, the sensor carriage 107 is fixed to the timing belts 119-1 and 119-2, which engage with pullies 117-1, 117-2, 118-1, 118-2. Those pullies are mounted in the rails so that those pullies can rotate around the shafts of the same as shown in FIG. 8.

The pullies 117-1 and 117-2 have a common shaft 117-1a which has another pully 116. When the shaft 117-1a rotates, the timing belts 119-1 and 119-2 which carry the sensor carriage 107 moves in the right direction or the left direction. The rotation of that shaft 117-1a is effected by the motor 114 through the shaft 114-a, the pully 115, the belt 115-a and another pully 116.

The sensor carriage 107 is electrically coupled with the electrical unit (103, 103, 105, 106) by the flat cable 108, which turns or folds at the position 108-1 depending upon the location of the sensor carriage 107.

The movable sensor is described in accordance with FIGS. 9 through 11. As shown in FIG. 10, the sensor carriage 107 has a plurality of projections 107-1, to which the circuit board 121 is fixed. The circuit board 121 is a printed circuit board having the image sensor 122. The lamp 125 is engaged with the socket 126. Said lamp 125 illuminates the black board 1 which reflects the beam 128. The reflected beam which has the information of the pattern on the black board is focused on the image sensor 122 through the rod lens 123. The light shield 127 prevents the direct beam from the lamp 125 to the image sensor 122.

In FIGS. 9 and 11, the carriage has flanges 107-2a and 107-2b, to which the rollers 124-1 and 124-2 are mounted. Those rollers 124-1 and 124-2 can run along the rails 102-1 and 102-2 so that the carriage can move smoothly. The flanges 107-2a and 107-2b accept strips 107-3a, 107-4a, 107-3b and 107-4b, by screws. The timing belts 119-1 and 119-2 are fixed between those strips so that those timing belts move the sensor carriage along the rails 102-1 and 102-2.

The present embodiment uses also an electrical circuit similar to FIG. 5A.

When the pattern on the black board 101 is completed, the operating panel 4 sends a control signal to the control 70, which forwards, then, various control signals to each circuit portion of the system. Then, the motor 114 rotates and moves the timing belts 119-1 and 119-2 through the pully 115, the timing belt 115-a, the pully 116, and the pullies 117-1 and 117-2 so that the sensor carriage 107 fixed to the timing belts 119-1 and 119-2 moves along the rails with a constant speed. Each scanning line on the pattern on the black board is scanned by the image sensor, which receives the reflected beam from the lamp 125 through the rod lens 123. Thus, the image sensor 122 converts the visual pattern on the black board to an electrical signal. Since the image sensor moves with a constant speed along the black board, all the scanning lines of the pattern is converted to an electrical signal. The electrical signal is forwarded to a printing portion to print the pattern on a paper as is the case of the previous embodiment of FIG. 5A. The system can also transmit the pattern to a remote terminal through a telephone line, and further, store the pattern for the late printing as is the case of the previous embodiment of FIG. 5A.

Some modifications are possible to those skilled in the art from the various embodiments. For instance, the black board in the embodiment of FIGS. 6 through 11 can move and the sensor carriage is fixed. Further, a conventional black board can be used as the print board of the present invention. In that case, a pair of rails are attached on a conventional black board to improve the conventional black board to a print board. Also, an erasable sheet can be used, instead of a black board. Further, the sensor carriage which has a motor for transferring the carriage is possible, and in that case, no timing belt for moving the carriage is necessary. Further, a circular black board may be possible, and in that case, the scanning is effected either by rotating the circular black board, or by rotating the sensor carriage, instead of a linear transfer of a sensor carriage or a black board.

Some of the particular advantages of the present print board are enumerated as follows.

(a) No memorandum on a meeting is necessary, and the participants can discuss without taking a memorandum.

(b) No error occurs in taking a memorandum in a meeting.

(c) The print board has many pages which are provided by a drum.

(d) As a printer is mounted in a print board, a hard copy is taken quickly.

(e) A pattern drawn on a sheet is erasable, and therefore, a sheet can be used repetitively.

(f) A pattern can be transmitted to a remote terminal where a hard copy is taken.

(g) A pattern can be stored in a memory, which reproduces the pattern lately.

From the foregoing it will now be apparent that a new and improved print board has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An electronic print board comprising;
   (a) a housing,
   (b) a writing means mounted on said housing for receiving any pattern erasably written thereon with a pen means,
   (c) an elongated lamp for illuminating an elongated portion on said writing means,
   (d) an image sensor mounted in said housing to provide an electrical signal relating to the pattern on a scanning line which is illuminated by said lamp,
   (e) means for relatively moving said image sensor to said writing means for full scanning of the pattern on said writing means, (f) a printer for printing the pattern on said writing means with smaller size than said pattern according to said electrical signal from said image sensor, wherein said writing means is a flexible sheet which is movable by rotating a roller sandwiching said writing means, and said image sensor is fixed.

2. An electronic print board according to claim 1, wherein said pen uses an erasable ink which is erased by illuminating the pattern with a light beam, or friction.

3. An electronic print board according to claim 1, wherein a rigid cardboard is provided behind said flexible sheet.

4. An electric print board according to claim 1, wherein means for transmitting said electrical signal to a remote terminal through a telephone line is provided.

5. An electronic print board according to claim 1, wherein a digital memory for storing said pattern is provided so that late printing is possible by reading out content of said memory and applying read out signal to said printer.

6. An electronic print board according to claim 1, wherein a light shield panel is provided between said lamp and said image sensor so that direct beam from the lamp to the image sensor is prevented.

7. An electronic print board according to claim 1, further comprising a castor fixed to said housing.

8. An electronic print board according to claim 1, wherein said flexible sheet is made of plastics, and said pen means is a felt pen.

9. An electronic print board according to claim 8, wherein said flexible sheet is in the shape of endless loop.

10. An electronic print board comprising;
(a) a housing,
(b) a writing means mounted on said housing for receiving any pattern erasably written thereon with a pen means,
(c) an elongated lamp for illuminating an elongated portion on said writing means,
(d) an image sensor mounted in said housing to provide an electrical signal relating to the pattern on a scanning line which is illuminated by said lamp,
(e) means for relatively moving said image sensor to said writing means for full scanning of the pattern on said writing means,
(f) a printer for printing the pattern on said writing means with smaller size than said pattern according to said electrical signal from said image sensor, wherein said writing means is a black board, said pen means is a chalk and said image sensor moves along said black board.

11. An electronic print board according to claim 10, wherein means for transmitting said electrical signal to a remote terminal through a telephone line is provided.

12. An electronic print board according to claim 10, wherein a digital memory for storing said pattern is provided so that late printing is possible by reading out content of said memory and applying read out signal to said printer.

13. An electronic print board according to claim 10, wherein a light shield panel is provided between said lamp and said image sensor so that direct beam from the lamp to the image sensor is prevented.

14. An electronic print board according to claim 10, further comprising a castor fixed to said housing.

* * * * *

REEXAMINATION CERTIFICATE (975th)
United States Patent
Takayama et al.

[11] B1 4,587,568
[45] Certificate Issued  Dec. 27, 1988

[54] ELECTRONIC PRINT BOARD

[75] Inventors: Shoichiro Takayama; Yukio Suga; Joji Tadokoro; Yukinori Takeda, all of Tokyo, Japan

[73] Assignee: OKI Electric Industry Co., Ltd., Tokyo, Japan

Reexamination Request:
No. 90/001,223, Apr. 20, 1987

Reexamination Certificate for:
Patent No.: 4,587,568
Issued: May 6, 1986
Appl. No.: 588,548
Filed: Mar. 12, 1984

[30]  Foreign Application Priority Data

Mar. 18, 1983 [JP] Japan ............................ 58-44283
Mar. 18, 1983 [JP] Japan ............................ 58-44284

[51] Int. Cl.⁴ .................... H04N 1/10; H04N 1/00
[52] U.S. Cl. .................................. 358/293; 358/285; 358/294; 434/411; 434/429; 434/430
[58] Field of Search ............ 358/293, 294, 285, 256; 250/578, 563, 559; 355/5, 13

[56]  References Cited
U.S. PATENT DOCUMENTS
4,081,843  3/1978  Okano ............................ 358/294

FOREIGN PATENT DOCUMENTS 50-141330 11/1975 Japan .
50-143534 11/1975 Japan .
50-142040 11/1975 Japan .
51-92626  8/1976 Japan .
54-31217  3/1979 Japan .
55-139294 10/1980 Japan .
56-58360  5/1981 Japan .
57-111593 7/1982 Japan .
57-111594 7/1982 Japan .
57-111595 7/1982 Japan .
57-176767 11/1982 Japan .
58-87098  5/1983 Japan .
59-111462 6/1984 Japan .
59-111463 6/1984 Japan .

*Primary Examiner*—Edward L. Coles, Sr.

[57]  ABSTRACT

A pattern erasably written on a black board or a flexible sheet in a meeting is printed to a hard copy through scanning of the pattern by an image sensor which provides an electrical signal relating to the pattern, and printing the pattern on a paper according to said electrical signal. The present print board comprises a housing, a writing sheet or a black board mounted on said housing, an elongated lamp for illuminating an elongated portion of said sheet, an image sensor to provide an electrical signal relating to the pattern on a scanning line on the sheet illuminated by said lamp, means for relatively moving said image sensor to said sheet for full scanning of the pattern, and a printer for providing a hard copy of the pattern with smaller size than said pattern according to said electrical signal from said image sensor. The present print board has also a digital memory for storing the output of the image sensor for the late printing, and/or means for transmitting and receiving the pattern signal to and from a telephone line for a remote printing.

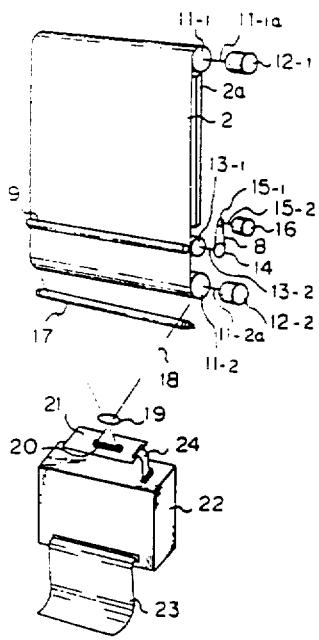

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 is cancelled.

Claims 1 and 10 are determined to be patentable as amended.

Claims 2-9, 11, 13 and 14, dependent on an amended claim, are determined to be patentable.

1. An electronic print board comprising;
(a) a housing,
(b) a writing means mounted on said housing for receiving any pattern erasably written thereon with a pen means, *said writing means being of a continuous length and having a plurality of writable screens,*
(c) an elongated lamp for illuminating an elongated portion on said writing means,
(d) an image sensor mounted in said housing to provide an electrical signal relating to the pattern on a scanning line which is illuminated by said lamp.
(e) *a* means for relatively moving said image sensor *with respect* to said writing means for full scanning of the pattern on said writing means,
(f) a printer for printing the pattern on said writing means with smaller size than said pattern according to said electrical signal from said image sensor. wherein said writing means is a flexible sheet which is movable by rotating a roller sandwiching said writing means, and said image sensor is fixed.

10. An electronic printing board comprising;
(a) a housing;
(b) a writing means mounted on said housing for receiving any pattern erasably written thereon with a pen means;
(c) an elongated lamp for illuminating an elongated portion on said writing means,
(d) an image sensor mounted in said housing to provide an electrical signal relating to the pattern on a scanning line which is illuminated by said lamp,
(e) *a* means for relatively moving said image sensor *with respect* to said writing means for full scanning of the pattern on said writing means, *said means automatically moving said sensor with a driving means,*
(f) a printer for printing the pattern on said writing means with smaller size than said pattern according to said electrical signal from said image sensor, wherein said writing means is a black board, said pen means is a chalk and said image sensor moves along with black board, *and*
(g) *a digital memory for storing said pattern, wherein late printing is accomplished by reading out the pattern stored in said digital memory to said printer.*